(12) United States Patent
Iwane et al.

(10) Patent No.: US 9,344,659 B2
(45) Date of Patent: May 17, 2016

(54) IMAGE PICKUP APPARATUS

(71) Applicant: CANON KABUSHIKI KAISHA, Tokyo (JP)

(72) Inventors: Masaaki Iwane, Sagamihara (JP); Akira Okita, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/459,069

(22) Filed: Aug. 13, 2014

(65) Prior Publication Data

US 2015/0049225 A1 Feb. 19, 2015

(30) Foreign Application Priority Data

Aug. 19, 2013 (JP) ................................ 2013-169507

(51) Int. Cl.
- *H04N 5/378* (2011.01)
- *H04N 5/3745* (2011.01)
- *H04N 5/357* (2011.01)

(52) U.S. Cl.
CPC .............. *H04N 5/378* (2013.01); *H04N 5/357* (2013.01); *H04N 5/3745* (2013.01)

(58) Field of Classification Search
CPC ..... H04N 5/378; H04N 5/3745; H04N 5/357; H04N 5/3696
See application file for complete search history.

(56) References Cited

U.S. PATENT DOCUMENTS

| | | | | |
|---|---|---|---|---|
| 7,324,144 B1* | 1/2008 | Koizumi | ................ | H04N 5/355 348/294 |
| 2002/0036257 A1* | 3/2002 | Yamashita | ......... | H04N 5/23212 250/208.1 |
| 2010/0007760 A1* | 1/2010 | Suzuki | ................... | H04N 5/343 348/222.1 |
| 2013/0120624 A1* | 5/2013 | Okita | ..................... | H04N 5/335 348/300 |
| 2013/0222631 A1* | 8/2013 | Iwane | .................. | H04N 5/3658 348/222.1 |

FOREIGN PATENT DOCUMENTS

JP 2009-224524 A 10/2009

* cited by examiner

*Primary Examiner* — Jason Flohre
(74) *Attorney, Agent, or Firm* — Canon USA, Inc., IP Division

(57) ABSTRACT

In an image pickup apparatus, a noise signal holding unit holds a noise signal output from a pixel unit and outputs the noise signal to a following-stage circuit. A first signal holding unit holds a first optical signal based on signals generated by N photoelectric conversion elements in the pixel unit and outputs the first optical signal to the following-stage circuit where N is an integer equal to or greater than 1. A second signal holding unit holds a second optical signal based on signals generated by M photoelectric conversion elements in the pixel unit and outputs the second optical signal to the following-stage circuit where M is an integer equal to or greater than 2 and greater than N. The signal output from the second signal holding unit has a greater common mode noise rejection ratio than that output from the first signal holding unit.

17 Claims, 5 Drawing Sheets

IMAGE PICKUP APPARATUS

BACKGROUND OF THE INVENTION

1. Field of the Invention

The present invention relates to an image pickup apparatus, and more particularly, to a layout of a signal holding unit of a column circuit of the image pickup apparatus.

2. Description of the Related Art

In an image pickup apparatus such as a CMOS area sensor chip or the like, it is necessary to achieve a high signal-to-noise (S/N) ratio while achieving a small pixel size and high performance. To achieve a high S/N ratio, Japanese Patent Laid-Open No. 2009-224524 discloses a technique in which a noise signal analog memory and an image signal analog memory are disposed so as to be parallel to a direction in which a column signal line extends.

SUMMARY OF THE INVENTION

The column circuit needs to be disposed within an area with a width equal to a pixel pitch or an integral multiple of the pixel pitch. However, in a case where a focus signal is read out in addition to an image signal from a pixel, the column circuit tends to become large in size, which may make it difficult to dispose the column circuit within the supposed area. Thus, the present invention provides a technique to properly lay out the column circuit.

In an aspect of the invention, an image pickup apparatus includes a plurality of pixel units each including a plurality of photoelectric conversion elements, amplifying transistors configured to amplify signals generated by the plurality of photoelectric conversion elements, and reset transistors configured to reset the signals generated by the plurality of photoelectric conversion elements. The image pickup apparatus includes a noise signal holding unit configured to hold a noise signal output from the pixel unit, a first signal holding unit configured to hold a first optical signal based on signals generated by N photoelectric conversion elements and output from the pixel unit where N is an integer equal to or greater than 1, and a second signal holding unit configured to hold a second optical signal based on signals generated by M photoelectric conversion elements and output from the pixel unit where M is an integer equal to or greater than 2 and greater than N, wherein a common mode noise rejection ratio achieved in a noise subtraction process in which the noise signal held and output by the noise signal holding unit is subtracted from the second optical signal held and output by the second signal holding unit is greater than a common mode noise rejection ratio achieved in a noise subtraction process in which the noise signal held and output by the noise signal holding unit is subtracted from the first optical signal held and output by the first signal holding unit.

Further features of the present invention will become apparent from the following description of exemplary embodiments with reference to the attached drawings.

DESCRIPTION OF THE EMBODIMENTS

First, a general aspect of the invention is described below.

Figure 2:
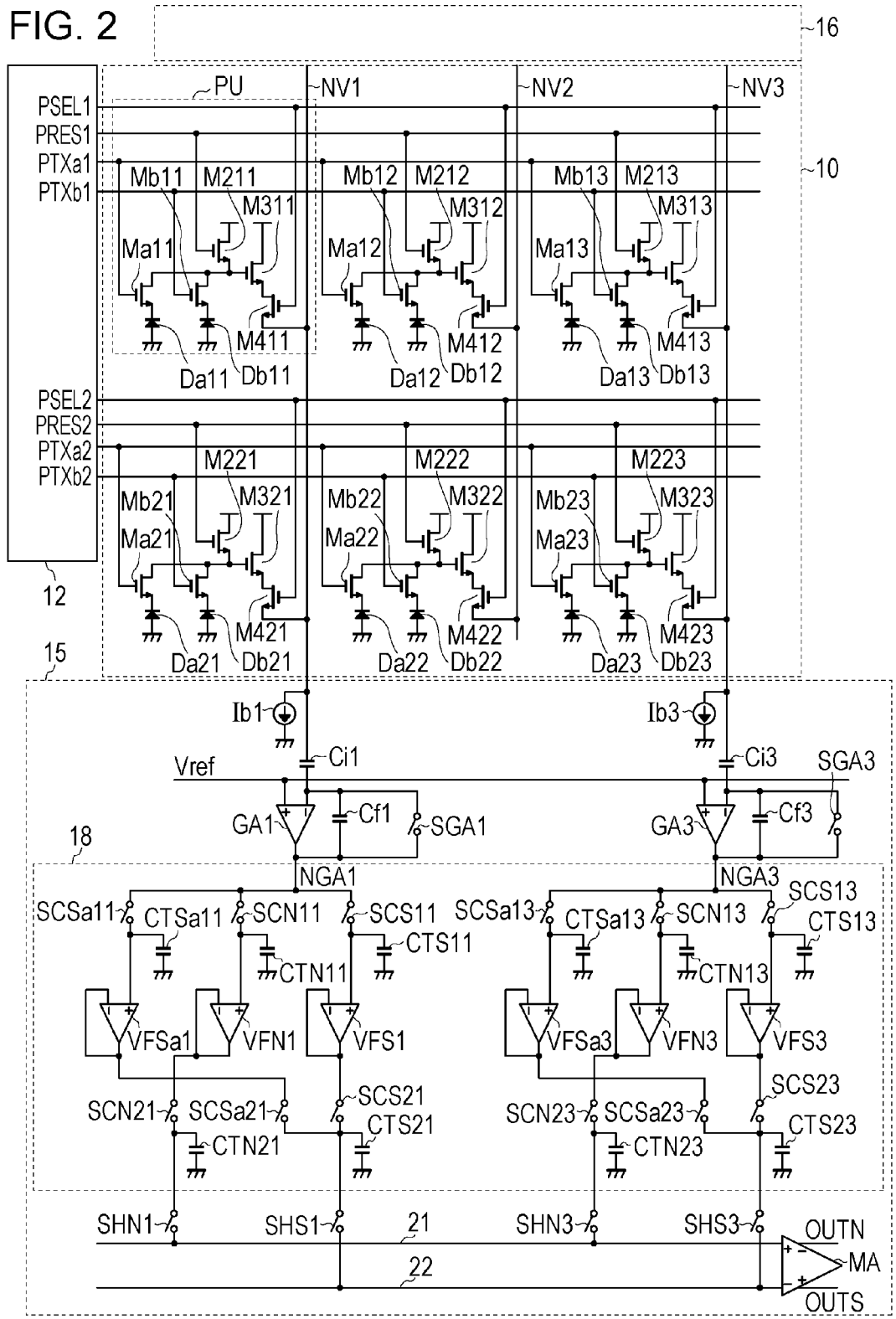
FIG. 2 is an equivalent circuit diagram of the image pickup apparatus according to the first embodiment.

A image pickup apparatus according to an aspect of the invention includes a plurality of pixel units each including a plurality of photoelectric conversion elements, amplifying transistors configured to amplify signals generated by the plurality of photoelectric conversion elements, and reset transistors configured to reset the signals generated by the plurality of photoelectric conversion elements. FIG. 2 illustrates an example in which pixel units PU are arranged in a matrix including 2 rows and 3 columns thereby forming a pixel region 10.

Each pixel unit includes, by way of example, two photoelectric conversion elements (Da and Db). Each pixel unit configured in the above-described manner outputs a noise signal, a first optical signal based on a signal generated by one of the two photoelectric conversion element, and a second optical signal based on signals generated by the two photoelectric conversion elements. The image pickup apparatus configured to output signals in the above-described manner may be employed, for example, to perform a phase difference focus detection in an image sensing plane.

At a stage following the pixel unit, there is disposed a circuit including a noise signal holding unit configured to hold the noise signal, a first signal holding unit configured to hold the first optical signal, and a second signal holding unit configured to hold the second optical signal. In FIG. 2, the first signal holding unit is denoted by CTSa, the noise signal holding unit is denoted by CTN, and the second signal holding unit is denoted by CTS.

In this configuration, a subtraction process is performed by the circuit at the following stage to subtract the noise signal held by the noise signal holding unit from the first optical signal held by the first signal holding unit. As a result, a first subtracted signal is obtained. Furthermore, the circuit at the following stage performs a subtraction process to subtract the noise signal held by the noise signal holding unit from the second optical signal held by the second signal holding unit. As a result, a second subtracted signal is obtained. The above-described following-stage circuit may be disposed in the image pickup apparatus or outside the image pickup apparatus.

A feature of the present embodiment is in that the second subtracted signal has a common mode noise rejection ratio greater than the common mode noise rejection ratio of the first subtracted signal.

In the aspect of the invention, the configuration is not limited to that in which the subtraction process is performed within the image pickup apparatus, but signals satisfying the noise rejection ratios described above may be supplied to an external circuit connected to the image pickup apparatus and the subtraction process may be performed by the external circuit.

In many situations, it may be beneficial that the subtraction process is per formed by the following-stage circuit so as to provide the same common mode noise rejection ratio for all signals held by all signal holding units. However, in a case where circuit elements are laid out so as to achieve the same common mode noise rejection ratio for all signals held by all signal holding units while achieving a high S/N ratio, the result is an increase in total circuit size which thus undesirably results in an increase in a chip size. In contrast, in the present aspect of the invention, the common mode noise rejection ratio is varied so as to make it possible to read signals properly without increasing a circuit area on a chip.

In particular, the present aspect of the invention provides a high effect in a case where the signal held by the first signal holding unit is a focus detection signal, and the signal held by the second signal holding unit is an image signal. The image signal is used to form an image, and thus the image signal needs a high S/N ratio. On the other hand, the focus detection signal does not need a very high S/N ratio but it is sufficient to have an S/N ratio high enough to achieve a phase difference detection. Thus, by employing the configuration according to the present aspect of the invention, it becomes possible to properly read signals while suppressing an increase in an area of the column circuit.

It may be beneficial to lay out the noise signal holding unit and the second signal holding unit such that they has translational symmetry.

The translational symmetry refers to symmetry of a pattern in which when the noise signal holding unit and the second signal holding unit are translated in a direction in which they are arranged side by side, the result can have the same pattern as the original pattern. In the present aspect of the invention, at least one column circuit has translational symmetry. However, in the image pickup apparatus, it is common to dispose the column circuit periodically in a horizontal direction, and thus it may be beneficial that not only one column circuit but all column circuits has translational symmetry.

The invention is described in further detail below with reference to embodiments. Note that two or more embodiments may be combined, and such a combination falls in the scope of the present invention. Note that in figures, a numeral suffix following a reference symbol denotes an address or a location of a row or column. In the embodiments described below, it is assumed by way of example but not limitation that an image pickup apparatus is configured to be capable of performing a focus detection in an image sensing plane. Note that the invention may also be applied to other configurations. For example, the invention may be applied to a photoelectric conversion apparatus for 3-dimensional measurement.

First Embodiment

Figure 1:
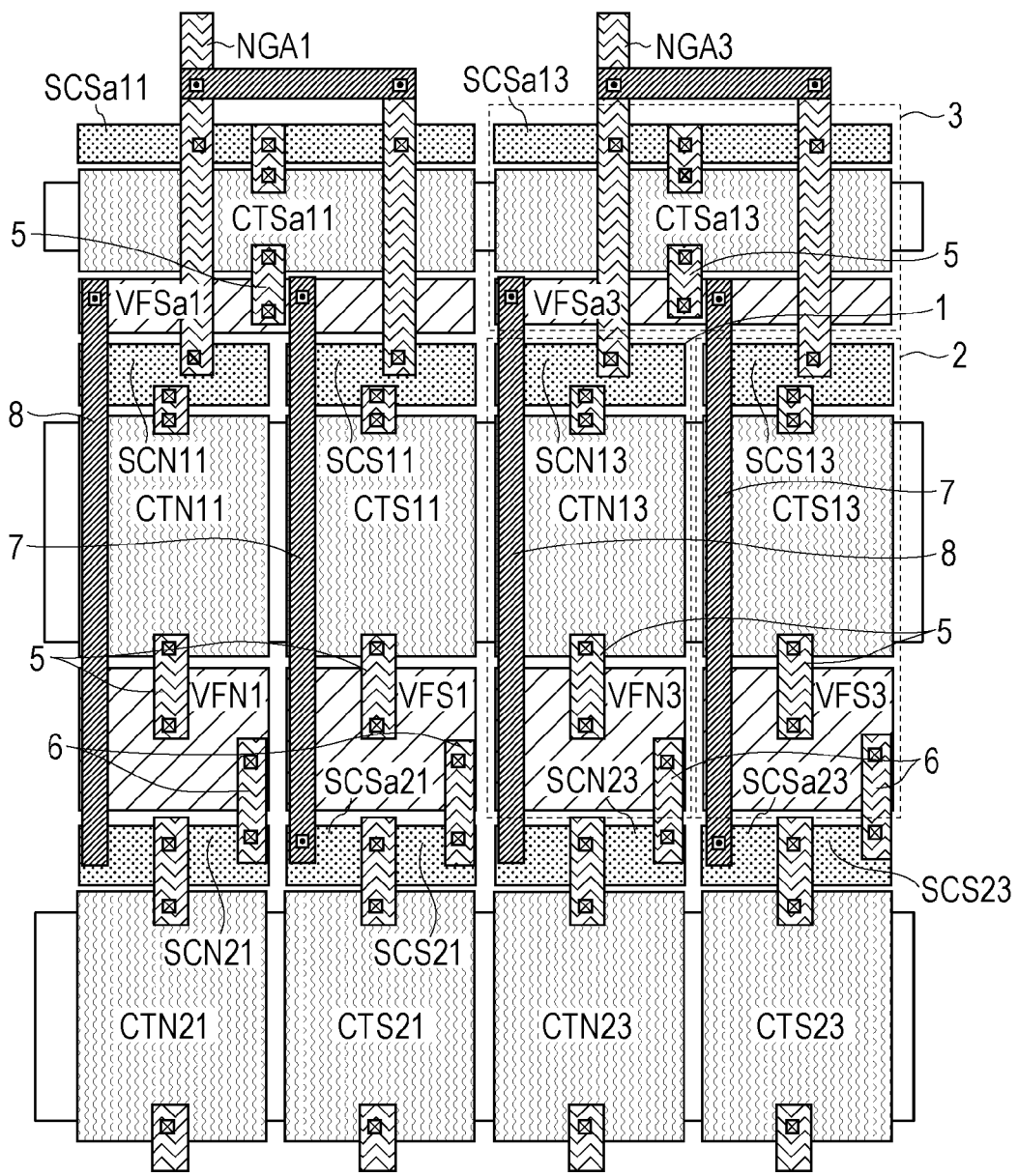
FIG. 1 is a schematic diagram illustrating a plan layout of an image pickup apparatus according to a first embodiment.

Referring to FIGS. 1 and 2, an image pickup apparatus according to a first embodiment is described below. FIG. 2 is an equivalent circuit diagram of the image pickup apparatus according to the first embodiment. FIG. 1 illustrates a plan layout of a part of a column circuit illustrated in the FIG. 2.

In the present embodiment, the image pickup apparatus is configured to be capable of reading an image signal and a focus detection signal. To achieve this, each pixel unit of the image pickup apparatus includes two photodiodes Da and Db functioning as photoelectric conversion elements for respectively forming an A image and a B image in a phase difference detection. In the image pickup apparatus such as a CMOS sensor for use in a camera or the like, a distance by which to move a lens to achieve a best focus is calculated based on a difference in peak position between the A-image signal and the B-image signal in an arbitrary area in the pixel area, and the focus is controlled based on the calculated distance. This may be used not only to achieve an automatic focus control but may be used in other applications such as acquisition of 3-dimensional image information based on measured distance to a subject.

In FIG. 1, a plurality of pixel units PU are disposed in a pixel region 10. The pixel units PU may be arranged in the form of a matrix. For example, several ten million pixel units PU are disposed to form the pixel region 10. A driving pulse is supplied to each pixel unit PU from a vertical scanning circuit 12.

Next, a typical configuration of a pixel unit is described below.

Transfer transistors Ma11 to Ma23 and Mb11 to Mb23 transfer electric charges of corresponding photoelectric conversion elements. Each transfer transistor may be realized using a MOS transistor.

Reset transistors M211 to M223 reset signals generated in photoelectric conversion elements. The resetting of the signals of the photoelectric conversion elements may be performed in a state in which signals exist in the photoelectric conversion elements or may be performed by resetting an input node of an amplifying transistor described below in a state in which a signal has been transferred to the input node of the amplifying transistor. Each reset transistor may be realized using a MOS transistor, or alternatively, each reset transistor may be realized using a junction-type field-effect transistor.

The amplifying transistors M311 to M323 amplify the signals generated by the plurality of photoelectric conversion elements in the same pixel unit. Note that each of the amplifying transistors M311 to M323 is shared by a plurality of photoelectric conversion elements. Each of the amplifying transistors M311 to M323 may be realized using a MOS transistor, or alternatively, each of the amplifying transistors M311 to M323 may be realized using a junction-type field-effect transistor.

Each of the selection transistors M411 to M423 selectively reads out a signal from a corresponding pixel unit PU to a corresponding column output line. Each of the selection transistors M411 to M423 may be realized using a MOS transistor. Note that the selection transistors M411 to M423 may be omitted when it is allowed to properly control operations of reset transistors and/or the like.

Next, elements disposed in an area at a stage following the pixel units are described below.

Column signal lines NV are disposed such that each of the pixel unit columns has one column signal line NV. Although each pixel unit column has one column signal line VN in the present example, each pixel unit column may have a plurality of column signal lines VN. A current source Ib supplies a bias current to corresponding one of the amplifying transistors M311 to M323 via a corresponding column signal line thereby allowing each of the amplifying transistors M311 to M323 to perform an amplifying operation. A specific example of the amplifying operation is a source follower operation.

Column circuits 15 and 16 are configured to process signals received from pixel units PU via column output lines while being scanned by a vertical scanning circuit 12. More specifically, the column circuit 15 is configured to process signals received from pixel units PU in odd-numbered columns. The column circuit 16 is configured to process signals received from pixel units PU in even-numbered columns. The processes performed by the column circuits 15 and 16 include noise removal, signal amplification, analog-to-digital conversion, and so on.

Amplifier circuits GA are provided in the column circuit 15 to amplify signals output from pixel units PU. The amplifier circuits GA may be variable-gain amplifiers. Clamping capacitors C are provided to reduce noise signals output from pixel units.

A signal holding unit 18 is a circuit configured to hold signals after the signals are amplified by the amplifier circuits GA. When seen from each amplifier circuit GA, the signal holding unit 18 includes three circuits disposed in parallel, that is, a circuit configured to hold a noise signal (a noise signal holding unit), a circuit configured to hold a first optical signal (a first signal holding unit), and a circuit configured to hold a second optical signal (a second signal holding unit). Note that the first optical signal is different from the second optical signal as described below. The first optical signal is an optical signal based on signals generated in N photoelectric conversion elements in a particular pixel unit where N is an integer equal to or greater than 1. The first optical signal is, for example, a focus detection signal. On the other hand, the second optical signal is an optical signal based on signals generated in M photoelectric conversion elements in a particular pixel unit where M is an integer equal to or greater than 2 and greater than N. The second optical signal is, for example, an image signal.

The layout diagram of FIG. 1 illustrates a layout of the signal holding unit 18. In FIG. 1 and FIG. 2, similar elements are denoted by similar reference symbols.

An output amplifier MA outputs a signal, which has arrived after propagation through horizontal output lines 21 and 22 after being processed by the column circuit 15, to the outside of the image pickup apparatus.

As illustrated in FIG. 2, the column circuit 16 is disposed at a location opposite to the column circuit 15 via the pixel region 10. The column circuit 15 in one column and the column circuit 16 in one column are disposed within an area with a width corresponding to 2 pixels of the pixel region 10. Optical signals detected by photodiodes Da11, Db11, Da13, and Db13 in odd-numbered columns in the pixel region 10 are read out to the column circuit 15. On the other hand, optical signals detected by photodiodes Da12 and Db12 in even-numbered columns in the pixel region 10 are read out to the column circuit 16. The following description is given as an example as to the column circuit 15. Note that the column circuit 16 may be similar in circuit configuration and layout to the column circuit 15.

Legends of FIG. 1 are described below. The legends of respective constituent elements are illustrated below the drawing.

A buffer, which is one of circuit elements, is disposed in each area (VF) hatched with largely spaced slanted lines. An analog switch, which is another one of circuit elements, is disposed in each area (SW) shaded with dots.

Active regions, various wiring layers, polysilicon, contact plugs, via plugs, and the like are used as elements for connecting the circuit elements or as elements for forming analog memories. An active region is disposed in each non-shaded area. A first wiring layer is disposed in each area (M1) shaded with horizontal wavy lines. A second wiring layer is disposed in each area (M2) hatched with closely spaced slanted lines. The second wiring layers are located at a higher level than the first wiring layers. In each area (CNT) having a symbol x therein, a contact plug is disposed that connects between an active region and a first wiring layer or between a polysilicon and a first wiring layer. In each area (Via1) having a dot therein, a via plug is disposed that connects between a first wiring layer and a second wiring layer. In each area (poly) shaded with vertical wavy lines, polysilicon is disposed that forms some circuit element.

Each area in which a buffer or an analog switch is disposed may include an active region, polysilicon, various wiring layers, a contact plug, and a via plug although a detailed layout thereof is not illustrated.

The noise signal holding unit includes a switch SCN and an analog memory CTN for performing a sample-and-hold operation on a noise signal. A buffer VFN is disposed at a stage following each analog memory CTN. The first signal holding unit includes a switch SCSa and an analog memory CTSa for performing a sample-and-hold operation on the first optical signal. A buffer VFSa is disposed at a stage following each analog memory CTSa. The second signal holding unit includes a switch SCS and an analog memory CTS for performing a sample-and-hold operation on the second optical signal. A buffer VFS is disposed at a stage following each analog memory CTS.

In FIG. 1, a set 1 includes a noise signal switch SCN13, an analog memory CTN13, and a buffer VFN3. A set 2 includes a second optical signal switch SCS13, an analog memory CNS13, and a buffer VNS3. A set 3 includes a first optical signal switch SCSa13, an analog memory CTSa13, and a buffer VNSa3.

A conductor pattern NGA forms an output node of the amplifier circuit GA.

A conductor pattern 5 forms input nodes of the buffers VFSa1, VFSa3, VFN1, VFN3, VFS1, and VFS3. The conductor pattern 5 is realized using the first wiring layer.

A conductor pattern 6 forms output nodes of the buffers VFN1, VFN3, VFS1, and VFS3. The conductor pattern 6 is realized using the first wiring layer.

A conductor pattern 7 forms output nodes of the first optical signal buffers VFSa1 and VFSa3. The conductor pattern 7 is realized using the second wiring layer.

A conductor pattern 8 is a dummy pattern. This conductor pattern 8 may be used to make an adjustment associated with, for example, parasitic capacitance, which does not influence an essential function of the intrinsic circuit. More specifically, the conductor pattern 8 is for reducing a difference in parasitic capacitance caused by the conductor pattern 7 disposing only above CTS11 and CTS13 but not above CTN11 and CTN13. Therefore, the conductor pattern 8 is not electrically connected to the analog switches SCN21 and SCN23 although they are electrically connected to the buffers VFSa1 and VFSa3.

Furthermore, in the present embodiment, the area of the first signal holding unit is smaller than the area of the second signal holding unit and/or the area of the noise signal holding unit.

Figure 3:
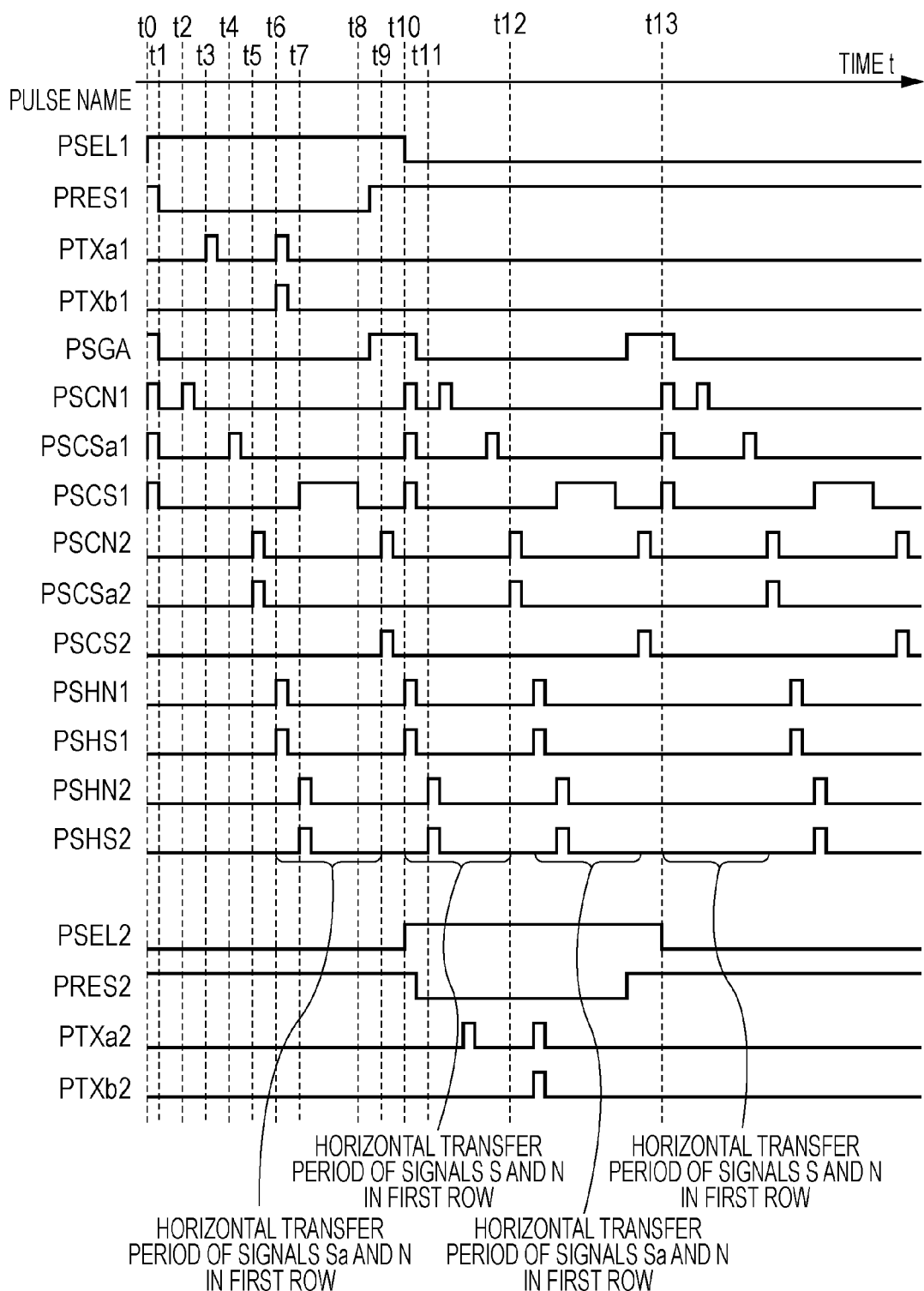
FIG. 3 is a timing chart associated with the image pickup apparatus according to the first embodiment.

FIG. 3 illustrates a timing chart associated with the image pickup apparatus according to the present embodiment. In FIG. 3, each pulse controls a transistor to turn on/off. It is assumed here by way of example that a high-level pulse causes a transistor to turn on and a low-level pulse causes the transistor to turn off.

A pulse PSEL1 controls the selection transistors M411 to M413, and a pulse PRES1 controls the reset transistors M211 to M213. A pulse PTXA1 controls the transfer transistors Ma11 to Ma13, and a pulse PTXB1 controls the transfer transistors Mb11 to Mb13.

A pulse PSEL2 controls the selection transistors M421 to M423. A pulse PRES2 controls the reset transistors M221 to M223. A pulse PTXA2 controls the transfer transistors Ma21 to Ma23. A pulse PTXB2 controls the transfer transistors Mb21 to Mb23. A pulse PSGA controls the switches SGA1 and SGA3. A pulse PSCN1 controls the switches SCN11 and SCN13. A pulse PSCS1 controls the switches SCS11 and SCS13. A pulse PSCSa1 controls the switches SCSa11 and SCSa13. A pulse PSCSa2 controls the switches SCSa21 and SCSa23. A pulse PSCN2 controls the switches SCN23 and SCN23. A pulse PSCS2 controls the switches SCS21 and SCS23. A pulse PSHN1 drives the switch SHN1, and a pulse PSHS1 drives the switch SHS1. A pulse PSHN3 drives the switch SHN3, and a pulse PSHS3 drives the switch SHS3.

First, at time t0, the vertical scanning circuit 12 transmits the pulse signal PSEL1 with the high level. As a result, the selection transistors M411 to M413 turn on and a first row of the pixel region 10 is selected. At this time t0, the pulse signal PSGA is at the high level, and thus the amplifier circuits GA1 and GA3 are brought into a state in which the amplifier circuits GA1 and GA3 operate as voltage followers with respect to a bias voltage Vref. Furthermore, the signal levels of PSCN1, PSCSa1, and PSCS1 change to the high level and thus the switches SCN11, SCSa11, SCS11, SCN13, SCSa131, and SCS13 turn on. As a result, the voltage Vref is written into all analog memories illustrated in the figure.

At time t1, the vertical scanning circuit 12 transmits the pulse signal PRES1 with the low level. As a result, the reset transistors M211 to M213 turn off, and the potential of the input node of each corresponding amplifying transistor goes into a floating state in which it is allowed to read out a noise signal N. In this state, noise signals N are amplified by the respective amplifying transistors M311 to M313 driven by current sources Ib1 and Ib3 and resultant amplified noise signals N appear at the column signal lines NV1 to NV3. At the same time as time t1, the signal level of PSGA changes to the low level, which causes the amplifier circuits GA1 and GA3 to go into a gain mode in which the amplifier circuits GA1 and GA3 respective have gains of Ci1/Cf1 and Ci3/Cf3 when seen from the column signal lines NV1 and NV3, where Ci denotes a capacitance value of input capacitance C of the amplifier circuit GA, and Cf denotes a capacitance value of feedback capacitance Cf of the amplifier circuit GA.

At the same time, the levels of PSCN1, PSCSa1, and PSCS1 change to the low level, and thus the switches SCN11, SCSa11, SCS11, SCN13, SCSa131, and SCS13 turn off.

At time t2, the level of PSCN1 changes to the high level, and thus the switches SCN11 and SCN13 turn on. As a result, noise signals N amplified by the amplifier circuits GA1 and GA3 provided in each column are written to the analog memories CTN11 and CTN13.

At time t3, the vertical scanning circuit 12 transmits the pulse signal PTXa1 with the high level. As a result, the transfer transistors Ma11 to Ma13 turn off and charges of the photodiodes Da11 to Da13 are transferred to the input nodes of the corresponding amplifying transistors. This causes the voltages of the input nodes of the respective amplifying transistors to change, and A-image signals Sa appear on the column signal lines NV1 to NV3.

At time t4, the level of PSCSa1 changes to the high level, and the A-image signals Sa amplified by the amplifier circuits GA1 and GA3 are written to the analog memories CTSa11 and CTSa13.

At time t5, the level of PSCN2 changes to the high level, and thus the switches SCN21 and SCN23 turn on. As a result, the noise signals N are written to the analog memories CTN21 and CTN23 from the analog memories CTN11 and CTN13 via the buffers VFN1 and VFN2. At time t5, at the same time, the level of PSCSa2 also changes to the high level, and thus the switches SCSa21 and SCSa23 turn on. As a result, the A-image signals Sa are written to the analog memories CTS21 and CTS23 from the analog memories CTSa11 and CTSa13 via the buffers VFSa1 and VFSa2.

At time t6, the levels of PSHN1 and PCHS1 change to the high level, and thus the switches SHN1 and SHS1 turn on. As a result, the noise signal N from the analog memory CTN21 and the A-image signal Sa from the analog memory CTS21 are horizontally transferred via the horizontal noise signal line 21 and the horizontal image signal line 22, respectively.

In the output amplifier MA, a subtraction process is performed to subtract the noise signal N from the A-image signal Sa, and a resultant noise-corrected A-image signal (Sa−N) in a first row and a first column is output to the outside of the chip via terminals OUTN and OUTS.

At time t6, the vertical scanning circuit 12 also transmits the pulse signals PTXa1 and PTXb1 with the high level, which causes the transfer transistors Ma11 to Ma13 and the transfer transistors Mb11 to Mb13 to turn on. As a result, charges corresponding to the B-image signal are transferred from the photodiodes Db11 to Db13 to the input nodes of the corresponding amplifying transistors, and the A-image signal charges and the B-image signal charges are added together. Thus, image signals S (S=Sa+Sb) obtained as the result of the addition between the A-image signal Sa and the B-image signal Sb are output to the column signal lines NV1 and NV2.

At time t7, the levels of PSHN2 and PSHN2 change to the high level, and thus the switches SHN3 and SHS3 turn on. As a result, the noise signal N from the analog memory CTN23 and the A-image signal Sa from the analog memory CTS23 are horizontally transferred via the horizontal noise signal line 21 and the horizontal image signal line 22, respectively. In the output amplifier MA, a subtraction process is performed to subtract the noise signal N from the A-image signal Sa, and a resultant noise-corrected A-image signal (Sa−N) in the first row and a second column is output to the outside of the image sensor via the terminals OUTN and OUTS.

At time t7, the level of PSCS1 also changes to the high level, and thus the switches SCS11 and SCS13 turn on. As a result, image signals S amplified by the amplifier circuits GA1 and GA3 provided in each column are written to the analog memories CTS11 and CTS13.

At time t8, the level of PSCS1 changes to the low level, and thus the switches SCS11 and SCS13 turn off, which causes the writing of the image signals S to the analog memories CTS11 and CTS13 to end.

At time t9, the horizontal transferring for the 3rd and following columns, which are not illustrated in the figure, is also ended. At time t9, the level of PSCN2 changes to the high level, and thus the switches SCN21 and SCN23 turn on. As a result, the noise signals N are again written to the analog memories CTN21 and CTN23 from the analog memories CTN11 and CTN13 via the buffers VFN1 and VFN3. At time t9, the level of PSCS2 also changes to the high level at the same time, and thus the switches SCS21 and SCS23 turn on. As a result, the image signals S are written to the analog memories CTS21 and CTS23 from the analog memories CTS11 and CTS13 via the buffers VFS1 and VFS3.

In a period from t6 to t9, the horizontal transferring of the A-image signals (Sa−N) and the writing of the image signals S to the analog memories CTS11 and CTS13 are performed in parallel. This makes it possible to reduce horizontal scanning period while acquiring focus detection information. Thus it becomes possible to increase the frame rate.

At time t10, the levels of PSHN1 and PCHS1 change to the high level, and thus the switches SHN1 and SHS1 turn on. As a result, the noise signal N from the analog memory CTN21 and the image signal S from the analog memory CTS21 are horizontally transferred via the horizontal noise signal line 21 and the horizontal image signal line 22, respectively. In the output amplifier MA, the noise signal N is subtracted from the image signal S, and a resultant noise-corrected image signal (S−N) in the first row and the first column is output to the outside of the chip via the terminals OUTN and OUTS. In the camera, he image signal (S−N) and the A-image signal (Sa−N) in the first row and the first column are acquired at this point of time, and thus it is possible to acquire the B-image signal Sb by determining the difference between them.

At time t10, the vertical scanning circuit 12 transmits the pulse signal PSEL2 with the high level, and thus the selection transistors M421 and M422 turn on. As a result, a second row of the pixel region 10 is selected, and the reading operation for the second row is started.

At time t11, the levels of PSHN2 and PCHS2 change to the high level, and thus the switches SHN3 and SHS3 turn on. As a result, the noise signal N from the analog memory CTN23 and the image signal S from the analog memory CTS23 are horizontally transferred via the horizontal noise signal line 21 and the horizontal image signal line 22, respectively.

At time t12, the horizontal transferring for the third and following columns, which are not illustrated in the figure, is also ended. At time t13, the vertical scanning circuit 12 transmits the pulse signal PSEL2 with the low level, and thus selection transistors M421 to M423 turn off. As a result, the second row of the pixel region 10 is brought into a non-selected state, the reading operation for the second row is ended.

In the present embodiment, as illustrated in FIG. 1, the set 1 associated with the noise signal holding unit and the set 2 associated with the image signal are laid out such that the set 1 and set 2 have translational symmetry in the direction in which the column signal lines NV1 and NV3 are arranged. Note that when some pattern has translational symmetry, translating this pattern results in the same pattern as the original pattern. The set 3 including the focus signal switch SCSa13, the analog memory CTSa13, and the buffer VNSa3 is disposed at a location closer to the pixel region 10 than the locations of the set 1 and the set 2 to the pixel region 10. A conductor pattern 6 is disposed and the potential of the conductor pattern 6 is set to be equal to the potential of the output nodes of the focus signal buffers VFSa1 and VFSa3 thereby reducing the difference in influence of the conductor pattern 7 on the set 1 and the set 2. Thus, when the noise signal N and the image signal S receives disturbing noise, the influence of disturbing noise on the noise signal N and the image signal S becomes substantially equal. Therefore, when the image signal (S−N) is output to the outside of the chip, it is possible to eliminate the influence of the noise signal N on the image signal S by subtracting the noise signal N from the image signal S.

Note that the locations of the set 1 and the set 3 do not have translational symmetry and they are located apart from each other. Therefore, the noise signal N and the focus signal Sa are influenced by different disturbing noise. Therefore, the external output focus signal (Sa−N) obtained as a result of the subtraction of N from Sa performed by the output amplifier MA may include larger residual noise than the image signal (S−N) may include.

That is, in the circuit at the following stage, the common mode noise rejection ratio achieved in the subtraction process in which the signal output from the noise signal holding unit is subtracted from the signal output from the second signal holding unit may be greater than the common mode noise rejection ratio achieved in the subtraction process in which the signal output from the noise signal holding unit is subtracted from the signal output from the first signal holding unit.

As illustrated in FIG. 1, the focus signal buffers VFSa1 and VFSa3 are different in layout from the noise signal buffers VFN1 and VFN3 and also from the image signal buffers VFS1 and VFS3. Because of the above-described difference in layout, the focus signal buffers VFSa1 and VFSa3 are different in input impedance, output impedance, and/or open-loop gain from the noise signal buffers VFN1 and VFN3 and the image signal buffers VFS1 and VFS3. That is, the difference in input impedance, output impedance, or open-loop gain between the noise signal buffer (VFN) and the image signal buffer (VFS) is smaller than the difference between the noise signal buffer (VFN) and the focus signal buffer (VFSa). Instead, it may be allowed to reduce the bias current to the focus signal buffers VFSa1 and VFSa3 thereby achieving a reduction in power consumption.

Although in the present embodiment it is assumed by way of example that the buffers VFN1, VFS1, VFSa1, VFN3, VFS3, and VFSa3 are voltage follower circuits, they may be source follower circuits or amplifiers with a gain equal to or greater than 1. The switches SCN111, SCN121, SCS111, SCS121 and the like may each be an analog switch realized using a combination of a n-type MOS transistor and a p-type MOS transistor, or may be realized using either one of a n-type MOS transistor and a p-type MOS transistor.

In the example illustrated in FIG. 2, one amplifier circuit GA is provided in each column. Alternatively, a plurality of column amplifiers may be provided such that each column amplifier is shared by a plurality of pixels.

The present embodiment makes it possible to read out an image signal with a high S/N ratio while suppressing an increase in area occupied by the column circuit on the chip.

Second Embodiment

Figure 4:
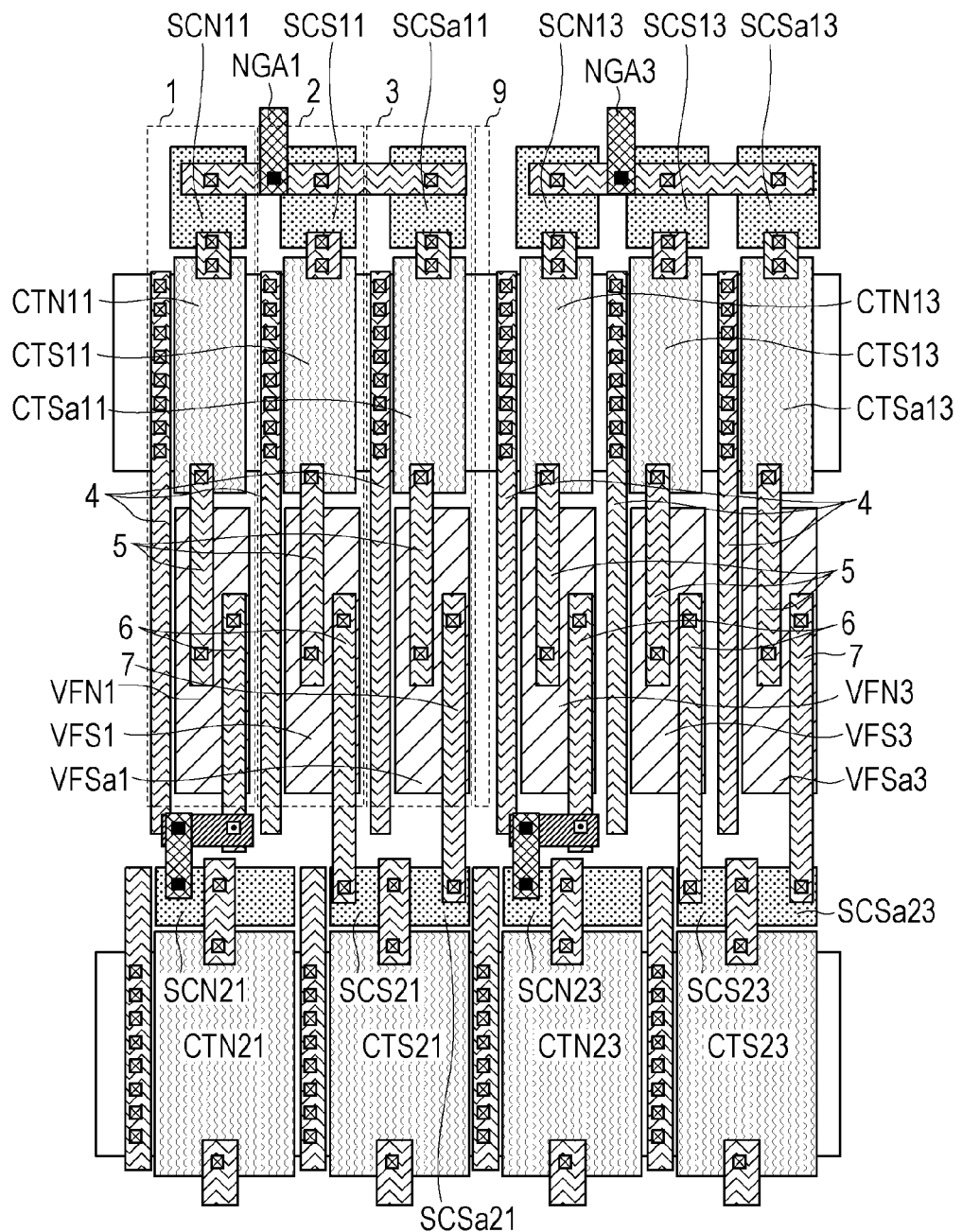
FIG. 4 is a schematic diagram illustrating a plan layout of an image pickup apparatus according to a second embodiment.

FIG. 4 is a schematic diagram illustrating a plan layout of an image pickup apparatus according to a second embodiment. Elements similar to those according to the first embodiment are denoted by similar reference symbols, and a further detailed description thereof is omitted. The second embodiment is different from the first embodiment in that the first signal holding unit is disposed so as to be parallel to the noise signal holding unit and the second signal holding unit such that they all are located side by side in the same direction.

In FIG. 4, solid black areas denote via plugs disposed in a second layer to electrically connect between a second wiring layer M2 and a third wiring layer M3. Each third wiring layer (M3) is denoted by a cross-hatched area (M3). Each conductor pattern 4 is a shielding line.

Note that the layout illustrated in FIG. 4 corresponds to a part surrounded by a broken line 18 in the circuit diagram illustrated in FIG. 2 according to the first embodiment.

As illustrated in FIG. 4, there is a space 9 adjacent to the right side of a set 3 including a focus signal switch, an analog memory, and a buffer. On the other hand, there is substantially no space to the right of a set 1 including a noise signal switch and an analog memory, and a buffer, and substantially no space to the right of a set 2 including an image signal switch and an analog memory, and buffer, and the set 1 and the set 2 have translational symmetry.

Although the set 1 and the set 2 have translational symmetry, the set 3 does not have translational symmetry with respect to the set 1 and the set 2.

This configuration is employed taking into account the fact that three analog memories CTN11, CTS11, and CTSa11 are respectively disposed for a noise signal, an image signal, and a focus signal, and two analog memories CTN21 and CTS21 are respectively disposed for a noise signal and an image signal. The above-described difference in terms of the existence/absence of space may occur depending on a manner of extending wirings in the layout or a manner of determining a grid side to reduce a photomask cost, or the like. In the present embodiment, to make efficient use of such a difference in space in layout that may inevitably occur during a production process, the set 3 including the switch, the analog memory, and the buffer for the focus signal is laid out so as to not have translational symmetry. As a result, polysilicon of the focus signal analog memory CTSa11 is allowed to be spaced a large distance apart from a shielding line 4 located on the right-hand side of the polysilicon. In this layout, if all capacitance components including even parasitic capacitance are taken into account, the capacitance of the focus signal analog memory CTSa11 is smaller than that of either one of the analog memories CTN11 and CTS11.

There is a large space to the right of the focus signal buffer VFSa1, and thus, if parasitic resistance and parasitic capacitance are taken into account, the focus signal buffer VFSa1 is different from the buffers VFN1 and VFS1 in terms of input impedance, output impedance, or open-loop gain because of the difference in layout. The output signal from the focus signal buffer VFSa1 does not need to have high accuracy compared with the output signals from the buffers VFN1 and VFS1, and thus it may be allowed to reduce the bias current to the focus signal buffers VFSa1 and VFSa3.

Third Embodiment

Figure 5:
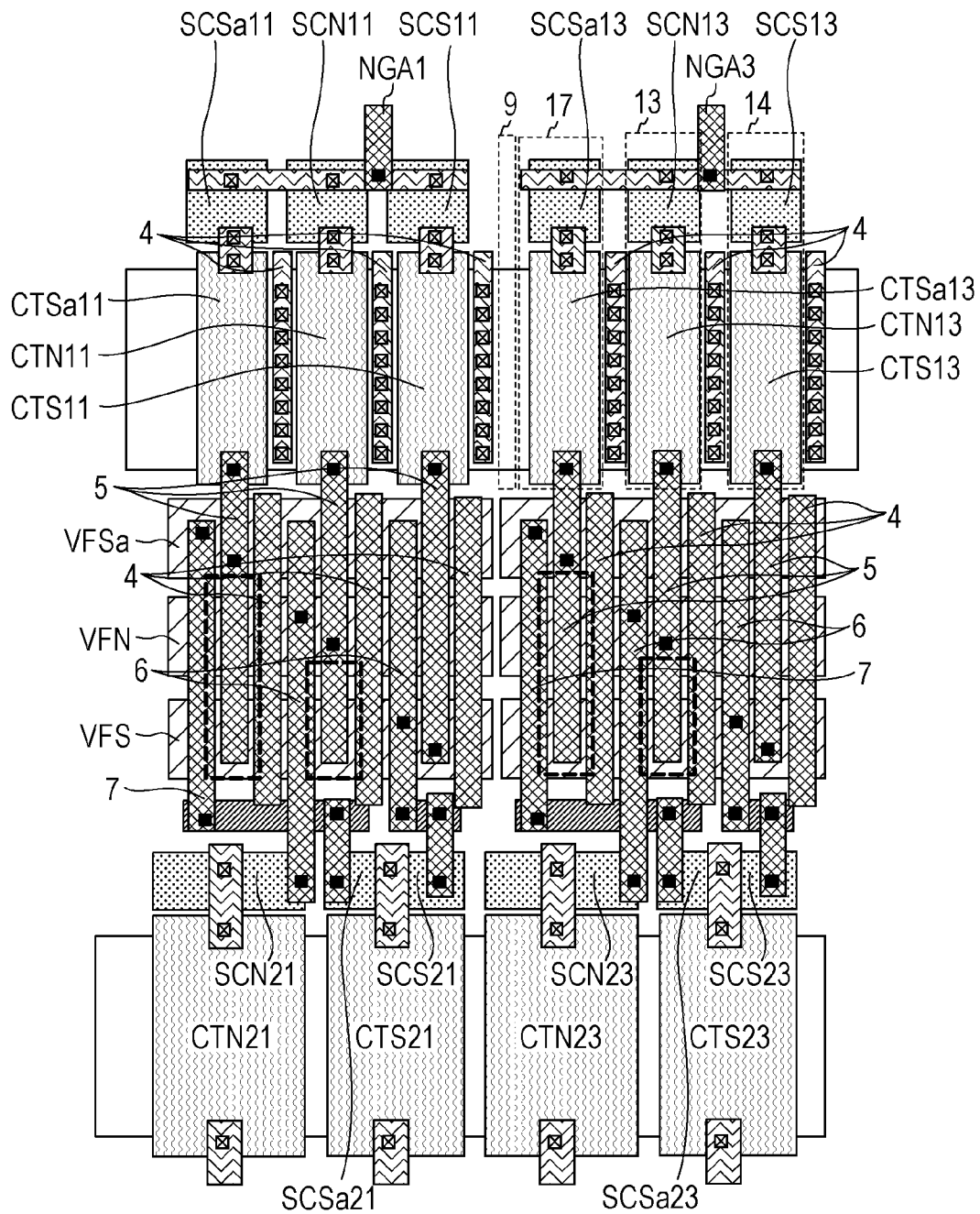
FIG. 5 is a schematic diagram illustrating a plan layout of an image pickup apparatus according to a third embodiment.

FIG. 5 is a schematic diagram illustrating a layout of an image pickup apparatus according to a third embodiment. Note that the layout illustrated in FIG. 5 corresponds to a part surrounded by a broken line 18 in the circuit diagram illustrated in FIG. 2 according to the first embodiment. In FIG. 5, elements similar to those according to the first or second embodiment are denoted by similar reference symbols, and a further detailed description thereof is omitted. The third embodiment is different from the second embodiment in that the conductor pattern 5 forming the input node of each of buffers VFSa and VFN includes a dummy part.

In FIG. 5, a set 13 including a switch and an analog memory for a noise signal, a set 14 including a switch and an analog memory for an image signal, and a set 17 including a switch and an analog memory for a focus signal are arranged side by side in one direction.

As illustrated in FIG. 5, the conductor pattern 5 forming the input node of each of the buffers VFSa and VFN includes the dummy part represented by a thick broken line in FIG. 5 such that the dummy part reduces the difference between input capacitance of the input node of the buffer VFS and the input capacitance of the input node of each of the buffers VFSa and VFN.

As illustrated in the layout diagram of FIG. 5, there is a large space to the left of the set 17 including the switch SCSa13 and the analog memory CTSa for the focus signal. On the other hand, there is a small space to the left of o the set 13 including the switch SCN13 and the analog memory CTN13 for the noise signal, and there is a small space to the left of the set 14 including the switch SCS13 and the analog memory CTS13 for the image signal. The set 13 and the set 14 have translational symmetry in terms of the areas surrounded by shielding lines 4. On the other hand, because of the above-described difference in space, the set 17 does not have translational symmetry with respect to the set 13 and the set 14.

This configuration is employed taking into account the fact that three analog memories CTN11, CTS11, and CTSa11 are respectively disposed for a noise signal, an image signal, and a focus signal, and two analog memories CTN21 and CTS21 are respectively disposed for a noise signal and an image signal. The above-described difference in terms of the existence/absence of space may occur depending on a manner of extending wirings in the layout or a manner of determining a grid side to reduce a photomask cost, or the like.

In the present embodiment, to make efficient use of such a difference in space, spaces are assigned not equally to the respective signal holding units such that the polysilicon of the focus signal analog memory CTSa11 is spaced a large distance apart from the shielding line 4 located to the left of the polysilicon and thus the capacitance of the focus signal analog memory CTSa11 is smaller than that of either one of the analog memories CTN11 and CTS11.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-169507, filed Aug. 19, 2013, which is hereby incorporated by reference herein in its entirety.

What is claimed is:

1. An image pickup apparatus including a plurality of pixel units each including a plurality of photoelectric conversion elements, a plurality of amplifying transistors configured to amplify signals generated by the plurality of photoelectric conversion elements, and a plurality of reset transistors configured to reset the signal generated by the plurality of photoelectric conversion elements, the image pickup apparatus comprising:

a noise signal holding unit configured to hold a noise signal output from the pixel unit and output the noise signal to a following-stage circuit;

a first signal holding unit configured to hold a first optical signal based on signals generated by N photoelectric conversion elements and output from the pixel unit and output the first optical signal to the following-stage circuit where N is an integer equal to or greater than 1; and a second signal holding unit configured to hold a second optical signal based on signals generated by M photoelectric conversion elements and output from the pixel unit and output the second optical signal to the following-stage circuit where M is an integer equal to or greater than 2 and greater than N, wherein a common mode noise rejection ratio obtained as a result of a subtraction process by the following-stage circuit to subtract a signal output from the noise signal holding unit from a signal output from the second signal holding unit is greater than a common mode noise rejection ratio obtained as a result of a subtraction process by the following-stage circuit to subtract the signal output from the noise signal holding unit from a signal output from the first signal holding unit, and wherein an area of the first signal holding unit as viewed in plan is smaller than an area of the second signal holding unit as viewed in plan and/or than an area of the noise signal holding unit as viewed in plan.

2. An image pickup apparatus including a plurality of pixel units each including a plurality of photoelectric conversion elements, a plurality of amplifying transistors configured to amplify signals generated by the plurality of photoelectric conversion elements, and a plurality of reset transistors configured to reset the signal generated by the plurality of photoelectric conversion elements, the image pickup apparatus comprising:

a noise signal holding unit configured to hold a noise signal output from the pixel unit;

a first signal holding unit configured to hold and output a first optical signal based on signals generated by N photoelectric conversion elements and output from the pixel unit where N is an integer equal to or greater than 1; and a second signal holding unit configured to hold a second optical signal based on signals generated by M photoelectric conversion elements and output from the pixel unit where M is an integer equal to or greater than 2 and greater than N, wherein the second signal holding unit and the noise signal holding unit are disposed so as to have translational symmetry, and the first signal holding unit is disposed such that the first signal holding unit does not have translational symmetry with respect to either the noise signal holding unit or the first signal holding unit.

3. The image pickup apparatus according to claim 2, wherein the first optical signal held by the first signal holding unit is a focus detection signal, and the second optical signal held by the second signal holding unit is an image signal.

4. An image pickup apparatus including a plurality of pixel units each including a plurality of photoelectric conversion elements, a plurality of amplifying transistors configured to amplify signals generated by the plurality of photoelectric conversion elements, and a plurality of reset transistors configured to reset the signal generated by the plurality of photoelectric conversion elements, the image pickup apparatus comprising:

a noise signal holding unit configured to hold a noise signal output from the pixel unit;

a first signal holding unit configured to hold a first optical signal based on signals generated by N photoelectric conversion elements and output from the pixel unit where N is an integer equal to or greater than 1; and a second signal holding unit configured to hold a second optical signal based on signals generated by M photoelectric conversion elements and output from the pixel unit where M is an integer equal to or greater than 2 and greater than N, wherein an area of the first signal holding unit as viewed in plan is smaller than an area of the second signal holding unit as viewed in plan and/or than an area of the noise signal holding unit as viewed in plan.

5. The image pickup apparatus according to claim 4, wherein the first optical signal held by the first signal holding unit is a focus detection signal, and the second optical signal held by the second signal holding unit is an image signal.

6. The image pickup apparatus according to claim 2, wherein an amplifier circuit configured to amplify a signal output from the pixel unit is disposed between the pixel unit and one of the noise signal holding unit, the first signal holding unit, and the second signal holding unit.

7. The image pickup apparatus according to claim 6, further comprising a plurality of buffers respectively corresponding to the noise signal holding unit, the first signal holding unit, and the second signal holding unit.

8. The image pickup apparatus according to claim 7, wherein the buffer that buffers the signal held by the noise signal holding unit and the buffer that buffers the signal held by the second signal holding unit are larger in bias current than the buffer that buffers the signal held by the first signal holding unit.

9. The image pickup apparatus according to claim 7, wherein the buffer that buffers the signal held by the noise signal holding unit and the buffer that buffers the signal held by the second signal holding unit are larger in bias current than the buffer that buffers the signal held by the first signal holding unit.

10. The image pickup apparatus according to claim 7, wherein the signal held by the noise signal holding unit and the signal held by the second signal holding unit are simultaneously read out via the corresponding buffers and then the subtraction process is performed, and the signal held by the noise signal holding unit and the signal held by the first signal holding unit are simultaneously read out via the corresponding buffers and then the subtraction process is performed.

11. The image pickup apparatus according to claim 7, further comprising signal holding units configured to hold signals output from the plurality of buffers.

12. The image pickup apparatus according to claim 4, wherein an amplifier circuit configured to amplify a signal output from the pixel unit is disposed between the pixel unit and one of the noise signal holding unit, the first signal holding unit, and the second signal holding unit.

13. The image pickup apparatus according to claim 12, further comprising a plurality of buffers respectively corresponding to the noise signal holding unit, the first signal holding unit, and the second signal holding unit.

14. The image pickup apparatus according to claim 13, wherein the buffer that buffers the signal held by the noise signal holding unit and the buffer that buffers the signal held by the second signal holding unit are larger in bias current than the buffer that buffers the signal held by the first signal holding unit.

15. The image pickup apparatus according to claim 13, wherein the buffer that buffers the signal held by the noise signal holding unit and the buffer that buffers the signal held by the second signal holding unit are larger in bias current than the buffer that buffers the signal held by the first signal holding unit.

16. The image pickup apparatus according to claim 13, wherein the signal held by the noise signal holding unit and the signal held by the second signal holding unit are simultaneously read out via the corresponding buffers and then the subtraction process is performed, and the signal held by the noise signal holding unit and the signal held by the first signal holding unit are simultaneously read out via the corresponding buffers and then the subtraction process is performed.

17. The image pickup apparatus according to claim 13, further comprising signal holding units configured to hold signals output from the plurality of buffers.

* * * * *